US012649893B2

(12) United States Patent
Kellar et al.

(10) Patent No.: US 12,649,893 B2
(45) Date of Patent: Jun. 9, 2026

(54) MICROBIAL CLEANING COMPOSITIONS

(71) Applicant: Novozymes A/S, Bagsvaerd (DK)

(72) Inventors: Kenneth Edmund Kellar, Fuquay Varina, NC (US); Hilary Cheeseman, Durham, NC (US); John Harp, Durham, NC (US)

(73) Assignee: Novozymes A/S, Bagsvaerd (DK)

( * ) Notice: Subject to any disclaimer, the term of this patent is extended or adjusted under 35 U.S.C. 154(b) by 699 days.

(21) Appl. No.: 17/998,315

(22) PCT Filed: Jun. 1, 2021

(86) PCT No.: PCT/US2021/035086

§ 371 (c)(1),
(2) Date: Nov. 9, 2022

(87) PCT Pub. No.: WO2021/243324

PCT Pub. Date: Dec. 2, 2021

(65) Prior Publication Data

US 2023/0220307 A1 Jul. 13, 2023

Related U.S. Application Data

(60) Provisional application No. 63/031,824, filed on May 29, 2020.

(51) Int. Cl.

| | |
|---|---|
| ***C11D 3/38*** | (2006.01) |
| ***C11D 1/29*** | (2006.01) |
| ***C11D 1/66*** | (2006.01) |

(52) U.S. Cl.
CPC ................ *C11D 3/381* (2013.01); *C11D 1/29* (2013.01); *C11D 1/662* (2013.01)

(58) Field of Classification Search
None
See application file for complete search history.

(56) References Cited

U.S. PATENT DOCUMENTS

| | | | | |
|---|---|---|---|---|
| 6,180,585 | B1 | 1/2001 | Schalitz et al. | |
| 2002/0182184 | A1* | 12/2002 | Pearl | C11D 3/386 424/94.4 |
| 2016/0183536 | A1* | 6/2016 | Martin | C05G 5/27 424/93.46 |
| 2021/0009922 | A1* | 1/2021 | Klingman | C11D 3/38618 |
| 2021/0370253 | A1* | 12/2021 | Roberts | C05G 3/50 |

FOREIGN PATENT DOCUMENTS

| | | | |
|---|---|---|---|
| WO | 2007/076337 | A2 | 7/2007 |
| WO | 2008/021761 | A2 | 2/2008 |
| WO | 2012/042220 | A1 | 4/2012 |
| WO | 2017/157772 | A1 | 9/2017 |

* cited by examiner

*Primary Examiner* — Holly Kipouros
(74) *Attorney, Agent, or Firm* — Eric J. Fechter

(57) ABSTRACT

The invention provides an aqueous microbial cleaning composition having excellent storage and germination properties, comprising bacterial spores and alkyl polyglucosides or sodium lauryl ether sulfates.

18 Claims, No Drawings

MICROBIAL CLEANING COMPOSITIONS

CROSS-REFERENCE TO RELATED APPLICATIONS

This application is a 35 U.S.C. 371 national application of international application no. PCT/US2021/035086 filed Jun. 1, 2021, which claims priority or the benefit under 35 U.S.C. 119 of U.S. provisional application No. 63/031,824 filed May 29, 2020. The content of each application is fully incorporated herein by reference.

FIELD OF THE INVENTION

The present invention relates to microbial cleaning compositions, which comprise spores of one or more *Bacillus* strains and surfactants that allow for spore stability during storage and for germination of the spores and outgrowth of the cells after application. The invention further relates to the use of such microbial cleaning compositions for cleaning of hard and soft surfaces, and for inhibiting or preventing the production of malodor.

BACKGROUND

Formulations for cleaning hard, non-porous surfaces include chemicals that provide specific functions, and the most important of these are surfactants. The primary function of the surfactants is to provide an immediate-cleaning effect.

Cleaning formulations may also include a biological component, such as bacterial spores. The main intent of including spores in the cleaning formulation is to provide a long-term cleaning effect. This long-term effect may not provide the major contribution to the total cleaning (sum of immediate-cleaning and long-term cleaning), but it can remove soils that were missed by the chemical cleaning either because of a poorly-performed initial cleaning procedure or because of soils that were located in hard-to-reach areas. Also, the long-term cleaning effect, even if incomplete, can loosen soils thereby making it easier to provide immediate cleaning the next time that the formulation is used to clean the surface. Such surfaces include hard surfaces inside and outside homes, private and public buildings, which are soiled and need to be cleaned. Other surfaces in need of cleaning are soft surfaces like textile cleaned in washing machines or by hand washing. In addition to the removal of soils from hard and soft surfaces, an important part of cleaning is the removal and prevention of malodor. Malodors are generally not extinguished by cleaning products but masked. Typically, products designed to tackle malodor contain volatile, and usually pleasant-smelling compounds, that when used in small quantities can mask foul odors. However, these compounds are generally short-lived. As such, there is a need in the art for new solutions to eliminate malodor.

The chemical components and biological components are not independent of each other, and their interactions can have negative consequences. Chemical components often adversely affect the stability of the spores in the formulation. Additionally, chemical components can prevent spores from germinating. To provide a long-term cleaning benefit, spores need to germinate and become living cells capable of outgrowth. Therefore, the chemical components need to perform the following three functions in the cleaning formulation:

(a) provide with a cleaning effect that immediately removes soils from surfaces, (b) allow spores in the cleaning formulation to remain stable (viable) during storage, and (c) allow spores to germinate and grow after application of the product during use.

A major challenge with respect to selection of chemical components is that surfactants that allow for spore stability and spore germination often do not provide adequate initial cleaning, as do surfactants that do not allow for spore stability and spore germination. To improve the initial cleaning, surfactants that allow for spore stability and germination may be combined with surfactants that do not allow spore stability and germination.

The immediate-cleaning effect can be enhanced by the addition of surfactants that allow for spore germination but cannot be used in formulations by themselves. Such surfactants, for example linear fatty alcohols, are insoluble in water, and therefore cannot be used by themselves in an aqueous cleaning formulation. However, such surfactants can be solubilized by combining with another surfactant, a primary surfactant, that is water soluble. When properly combined, this can increase the immediate-cleaning effect of the primary surfactant and allow for spore germination.

Additionally, chemical components additional to surfactants are also commonly included in cleaning formulations. For example, these components can function as builders, which assist or enable surfactants to provide their cleaning function; buffers, which control the pH of the cleaning formulation and may also provide a stabilizing benefit to spore stability; solvents, which can provide an additional cleaning benefit by removing soils that are difficult for surfactants to remove; preservatives, which prevent bacterial and fungal contamination; dyes, which give the formulation the desired color; and, fragrances, which give the formulation a pleasant scent.

SUMMARY OF THE INVENTION

The present invention provides, in a first aspect, an aqueous microbial cleaning composition, comprising (a) at least $10^4$ cfu/mL of bacterial spores, and (b) at least 0.1% w/w of a primary surfactant selected from the group consisting of alkyl polyglucosides and sodium lauryl ether sulfates;

wherein the surface tension of the composition is 30 mN/m or lower at 20° C.

Other aspects and embodiments of the invention are apparent from the description and examples.

Unless otherwise indicated, or if it is apparent from the context that something else is meant, all percentages are percentage by weight (% w/w).

DETAILED DESCRIPTION

We have found that bacterial spores can formulated in a liquid aqueous cleaning composition, where the spores remain stable (viable) during storage for months. At the same time the cleaning composition allows for germination of the spores and outgrowth of the cells upon application of the cleaning composition.

The high spore stability and germination efficiency is achieved by using a surfactant system comprising alkyl polyglycoside or sodium lauryl ether sulfate surfactants (primary surfactants). Further, we have found that these surfactants may be combined with other surfactants (secondary surfactants) that does not allow spore germination on their own, but which in combination with the primary surfactants allows for high spore stability and germination efficiency. Such secondary surfactants can be both water-soluble and water-insoluble. In the context of the invention, water-insoluble means a solubility of less than 0.1 g/L in pure water.

It is impossible to determine whether a water-insoluble surfactant allows spore germination in an aqueous formulation because it is insoluble in water. To be solubilized in water, addition of a water-soluble surfactant is required, and spore germination can only be evaluated for the combination of the surfactants.

Also, surface tension of the formulation is used as the measurement of initial-cleaning performance for a formulation. A surface tension of about 30 mN/m is a good estimate of the maximum surface tension that allows for acceptable cleaning. This is especially true since many soils are a combination of oils and solids. Removing the oil from the surface efficiently and effectively requires that the surface tension of the liquid detergent be lower than that of the oil. The surface tensions of commonly encountered oils are given in the table below, and it can be seen that the lowest surface tension is about 31 mN/m. Therefore, a detergent with a surface tension of 30 mN/m or lower will displace any of these common oils from a surface, and while displacing the oil will also displace any solids associated with the oil. Another reason for having a detergent with a surface tension of 30 mN/m or less is that many solid surfaces have critical surface tensions of above 30 mN/m (see Contact Angle, Wettability, and Adhesion, Advances in Chemistry Series, R. F. Gould, Editor, Volume 43, 1964, American Chemical Society, Chapters 1 and 21). For a liquid detergent to spontaneously spread on a surface, its surface tension must be equal to or below the critical surface tension of the surface. Consequently, due to having the ability to displace an oil already on the surface and having the ability to spread across the surface, a detergent with a surface tension of below 30 mN/m will have a best ability to provide good initial cleaning.

TABLE 1

Surface tension of common oils.

| Oil | Surface Tension (mN/m) | Temp (° C.) |
|---|---|---|
| Canola | 31.3 | 23 |
| Corn | 31.6 | 23 |
| Olive | 31.9 | 23 |
| Peanut | 31.3 | 23 |
| Soybean | 31.3 | 23 |
| Coconut | 31.5 | 25 |
| Sunflower | 33.5 | 25 |
| Mineral oil | 32.3 | 20 |
| Engine oil | 31 | 20 |

As described above, it is advantageous that the cleaning composition has a surface tension, which is lower than most common oils (see Table 1). Thus, the surface tension of the cleaning composition of the invention may be 30 mN/m or lower at 20° C. Preferably, the surface tension is in the range of 20-30 mN/m at 20° C.; more preferably 25-30 mN/m at 20° C.

The cleaning composition can be a concentrated solution, which is diluted with water before use, or a more dilute ready-to-use product.

Typically, the cleaning composition includes a chemical buffer to maintain a desired pH. Since bacterial spores are quite resistant to changes in the environmental pH, the pH of the cleaning composition may be in the range of pH 4-10, preferably in the range of pH 5-9, more preferably in the range of pH 6-8. The choice of chemical buffer used to achieve a desired pH value is well-known in the art but could, for example, be citrate/citric acid.

In an embodiment, the cleaning composition is boron-free.

Surfaces and Applications

Surfaces where these cleaners can be used include hard surfaces inside and outside homes, private and public buildings, such as floors, walls, countertops, faucets, sinks, drains, showers, showerheads, toilets and drains, high touch surfaces in public and in private, such as door handles, shopping cart handles, remote controls for TV sets or other equipment etc. Other surfaces in need of cleaning are soft surfaces like textile cleaned in washing machines or by hand washing. Or textile surfaces on furniture, in private and public vehicles and means of transportation.

The present invention also provides compositions for use in inhibiting malodor in cleaning machines such as laundry machines and automatic dishwashing machines, or in cleaning processes which target hard or soft surfaces.

Such surfaces include hard surfaces inside and outside homes, private and public buildings, such as floors, walls, countertops, faucets, sinks, drains, showers, showerheads, toilets and drains, high touch surfaces in public and in private, such as door handles, shopping cart handles, remote controls for TV sets or other equipment etc. Other surfaces in need of cleaning are soft surfaces like textile cleaned in washing machines or by hand washing. Or textile surfaces on furniture, in private and public vehicles and means of transportation.

The methods and compositions of the present invention may be used to treat an existing odor problem and/or as a preventative treatment to prevent a potential odor problem. The present invention may be used, for example, to inhibit malodor in laundry washing machines/processes, dry cleaning machines/processes, steam cleaning machines/processes, carpet cleaning machines/processes, dish washing machines/processes, and other cleaning machines/processes.

Malodor may be generated from a number of sources, mostly microbial and in particular bacterial sources (including compounds derived or produced therefrom).

Sources of malodor causing bacteria, include bacterium species selected from the group consisting of *Acinetobacter junii, Janibacter melois, Sphingobium ummariense, Sphingomonas panni*, Sphingomonadaceae, *Actinobacter tandoii, Junibacter melonis, Curtobacterium flaccumfaciens* subsp. *flaccumfaciens, Flavobacterium denitrificans, Staphylococcus epidermidis, Escherichia coli, Leclercia adecarboxylata, Enterobacter* sp., *Cronobacter sakazakii, Sphingobacterium faecium, Enterobacter cloacae, Pseudomonas veronii, Microbacterium luteolum, Morganella morganii, Pseudomonas* sp., *Pseudomonas marginalis, Citrobacter* sp., *Escherichia coli* strain JCLys, *Roseomonas aquatic, Pseudomonas panipatensis, Brevibacillus subtilis, Micrococcus luteus, Ralstonia eutropha, Caulobacter fusiformis, Stenotrophomonas maltophilia, Rhodococcus opacus, Brevi-undimonas intermedia, Agrobacterium tumefaciens* and in particular Alphaproteobacteria (a class of bacteria in the phylum Proteobacteria), and/or a combination thereof, and/or substances derived therefrom.

The methods and compositions may also be applied directly to an article treated (e.g., cleaned) in the cleaning machine or cleaning process, such as, to laundry treated in the machine. The article may be treated before cleaning, during the cleaning process, after the cleaning processes and any combination thereof.

Examples of such articles to be treated include soft surfaces like laundry, carpets, and fabrics, and hard surfaces like sinks, drains, toilets, showers, laundry machines, automatic dishwashing machines.

Surfactants

We have found that surfactants selected from the group of alkyl polyglucosides and sodium lauryl ether sulfates have excellent compatibility with bacterial spores, when used in a liquid microbial cleaning composition. These types of surfactants allow for both acceptable immediate cleaning, storage of bacterial spores for at least 8 weeks, and subsequent spore germination and outgrowth of cells upon use of the microbial cleaner. Thus, the microbial cleaning composition of the invention comprises, as a primary surfactant, a surfactant selected from the group consisting of alkyl polyglucosides and sodium lauryl ether sulfates.

Alkyl polyglycosides (APG) are a class of non-ionic surfactants widely used in a variety of applications. They are derived from sugars and readily biodegradable.

Sodium lauryl ether sulfates (SLES) are anionic surfactants found in many personal care products. They are derived from palm kernel oil or coconut oil. The most common types are SLES-1, SLES-2 and SLES-3, where the number indicates the average number of ethoxyl groups.

The microbial cleaning composition comprises the primary surfactant in an amount of at least 0.1% w/w. Preferably, the amount of the primary surfactant is at least 0.5% w/w; more preferably at least 1% w/w; even more preferably at least 2% w/w; and most preferably at least 5% w/w.

To improve the immediate-cleaning properties, the microbial cleaning composition may also include a secondary surfactant. Such secondary surfactants may be water-soluble or water-insoluble, as described above. The amount of the secondary surfactant may be higher or lower than the primary surfactant, while retaining the bacterial spore stability and germination efficiency properties. Thus, the ratio between the primary and secondary surfactants may be in the range of 1:10 to 20:1.

The secondary surfactants may be linear fatty alcohols, linear or branched alcohol ethoxylates, and/or alkylphenol ethoxylates.

Preferred linear fatty alcohols are selected from the group consisting of 1-octanol, 1-nonanol, 1-decanol, 1-undecanol, 1-dodecanol, and combinations thereof.

Preferred alkylphenol ethoxylates are selected from the group consisting of polyoxyethylenated nonylphenol, polyoxyethylenated octylphenol, and combinations thereof (both with varying moles of ethylene oxide).

Preferred linear alcohol ethoxylates are selected from the group consisting of Bio-Soft N23-6.5, Bio-Soft N25-7, Bio-Soft N25-9, and combinations thereof.

Preferred branched alcohol ethoxylates are selected from the group consisting of Triton HW-1000, Makon DA-6, Makon DA-9, and combinations thereof.

The total concentration of surfactants (primary and secondary) may be at least 0.1% w/w; preferably at least 0.5% w/w; more preferably at least 1% w/w; even more preferably at least 2% w/w; and most preferably at least 5% w/w. The upper limit of the total concentration of surfactants may be 20% w/w; thus, the total concentration of surfactants may be 0.1-20% w/w, 0.5-20% w/w, 1-20% w/w, 2-20% w/w, or 5-20% w/w.

The choice of surfactant concentration depends on the purpose of the composition, where a ready-to-use composition has a lower concentration than a composition intended to be diluted with water before use.

It may be desirable also to include a (inorganic) salt. The addition of a salt will decrease the surface tension of the cleaning composition of the invention to attain a surface tension of 30 mN/m or less, maintain stability of spores upon storage, allow spore germination, and allow cell outgrowth. Examples of suitable (inorganic) salts include, but are not limited to,

- sodium sulfate, potassium sulfate, ammonium sulfate,
- sodium carbonate, potassium carbonate, ammonium carbonate,
- sodium bicarbonate, potassium bicarbonate, ammonium bicarbonate,
- sodium nitrate, potassium nitrate, ammonium nitrate,
- sodium chloride, potassium chloride, ammonium chloride,
- sodium phosphate, potassium phosphate, ammonium phosphate,
- sodium citrate, potassium citrate, ammonium citrate.

Included are also the hydrates thereof. Particularly preferred salts are sodium nitrate, sodium sulfate, potassium nitrate, and potassium sulfate.

Bacterial Spores

The biological component used in the cleaning composition of the invention are bacterial spores, as opposed to vegetative cells. Preferably, the bacterial spores are *Bacillus* spores; even more preferably the bacterial spores are selected from the group consisting of *Bacillus subtilis, Bacillus licheniformis, Bacillus pumilus, Bacillus amyloliquefaciens, Bacillus velezensis, Bacillus megaterium, Bacillus atrophaeus, Bacillus mojavensis, Bacillus paralicheniformis*, and *Bacillus thuringiensis*; even more preferably the bacterial spores are spores selected from the group consisting of:

- *Bacillus subtilis* and *Bacillus licheniformis;*
- *Bacillus subtilis* and *Bacillus pumilus;*
- *Bacillus subtilis* and *Bacillus amyloliquefaciens;*
- *Bacillus subtilis* and *Bacillus velezensis;*
- *Bacillus subtilis* and *Bacillus megaterium;*
- *Bacillus subtilis* and *Bacillus atrophaeus;*
- *Bacillus licheniformis* and *Bacillus pumilus;*
- *Bacillus licheniformis* and *Bacillus amyloliquefaciens;*
- *Bacillus licheniformis* and *Bacillus velezensis;*
- *Bacillus licheniformis* and *Bacillus megaterium;*
- *Bacillus licheniformis* and *Bacillus atrophaeus;*
- *Bacillus pumilus* and *Bacillus amyloliquefaciens;*
- *Bacillus pumilus* and *Bacillus velezensis;*
- *Bacillus pumilus* and *Bacillus megaterium;*
- *Bacillus pumilus* and *Bacillus atrophaeus;*
- *Bacillus amyloliquefaciens* and *Bacillus velezensis;*
- *Bacillus amyloliquefaciens* and *Bacillus megaterium;*
- *Bacillus amyloliquefaciens* and *Bacillus atrophaeus;*
- *Bacillus velezensis* and *Bacillus megaterium;*
- *Bacillus velezensis* and *Bacillus atrophaeus;*
- *Bacillus megaterium* and *Bacillus atrophaeus;* and

- *Bacillus subtilis, Bacillus licheniformis*, and *Bacillus pumilus;*
- *Bacillus subtilis, Bacillus licheniformis*, and *Bacillus amyloliquefaciens;*
- *Bacillus subtilis, Bacillus licheniformis*, and *Bacillus velezensis;*
- *Bacillus subtilis, Bacillus licheniformis*, and *Bacillus megaterium;*
- *Bacillus subtilis, Bacillus licheniformis*, and *Bacillus atrophaeus;*

*Bacillus subtilis, Bacillus pumilus*, and *Bacillus amyloliquefaciens;*

*Bacillus subtilis, Bacillus pumilus*, and *Bacillus velezensis;*

*Bacillus subtilis, Bacillus pumilus*, and *Bacillus megaterium;*

*Bacillus subtilis, Bacillus pumilus*, and *Bacillus atrophaeus;*

*Bacillus subtilis, Bacillus amyloliquefaciens*, and *Bacillus velezensis;*

*Bacillus subtilis, Bacillus amyloliquefaciens*, and *Bacillus megaterium;*

*Bacillus subtilis, Bacillus amyloliquefaciens*, and *Bacillus atrophaeus;*

*Bacillus subtilis, Bacillus velezensis*, and *Bacillus megaterium;*

*Bacillus subtilis, Bacillus velezensis*, and *Bacillus atrophaeus;*

*Bacillus subtilis, Bacillus megaterium*, and *Bacillus atrophaeus;*

*Bacillus licheniformis, Bacillus pumilus*, and *Bacillus amyloliquefaciens;*

*Bacillus licheniformis, Bacillus pumilus*, and *Bacillus velezensis;*

*Bacillus licheniformis, Bacillus pumilus*, and *Bacillus megaterium;*

*Bacillus licheniformis, Bacillus pumilus*, and *Bacillus atrophaeus;*

*Bacillus licheniformis, Bacillus amyloliquefaciens*, and *Bacillus velezensis;*

*Bacillus licheniformis, Bacillus amyloliquefaciens*, and *Bacillus megaterium;*

*Bacillus licheniformis, Bacillus amyloliquefaciens*, and *Bacillus atrophaeus;*

*Bacillus licheniformis, Bacillus velezensis*, and *Bacillus megaterium;*

*Bacillus licheniformis, Bacillus velezensis*, and *Bacillus atrophaeus;*

*Bacillus licheniformis, Bacillus megaterium*, and *Bacillus atrophaeus;*

*Bacillus pumilus, Bacillus amyloliquefaciens*, and *Bacillus velezensis;*

*Bacillus pumilus, Bacillus amyloliquefaciens*, and *Bacillus megaterium;*

*Bacillus pumilus, Bacillus amyloliquefaciens*, and *Bacillus atrophaeus;*

*Bacillus pumilus, Bacillus velezensis*, and *Bacillus megaterium;*

*Bacillus pumilus, Bacillus velezensis*, and *Bacillus atrophaeus;*

*Bacillus pumilus, Bacillus megaterium*, and *Bacillus atrophaeus;*

*Bacillus amyloliquefaciens, Bacillus velezensis*, and *Bacillus megaterium;*

*Bacillus amyloliquefaciens, Bacillus velezensis*, and *Bacillus atrophaeus;*

*Bacillus amyloliquefaciens, Bacillus megaterium*, and *Bacillus atrophaeus;*

*Bacillus velezensis, Bacillus megaterium*, and *Bacillus atrophaeus;* and

*Bacillus subtilis, Bacillus licheniformis, Bacillus pumilus*, and *Bacillus amyloliquefaciens;*

*Bacillus subtilis, Bacillus licheniformis, Bacillus pumilus*, and *Bacillus velezensis;*

*Bacillus subtilis, Bacillus licheniformis, Bacillus pumilus*, and *Bacillus megaterium;*

*Bacillus subtilis, Bacillus licheniformis, Bacillus pumilus*, and *Bacillus atrophaeus;*

*Bacillus subtilis, Bacillus pumilus, Bacillus amyloliquefaciens*, and *Bacillus velezensis;*

*Bacillus subtilis, Bacillus pumilus, Bacillus amyloliquefaciens*, and *Bacillus megaterium;*

*Bacillus subtilis, Bacillus pumilus, Bacillus amyloliquefaciens*, and *Bacillus atrophaeus;*

*Bacillus subtilis, Bacillus amyloliquefaciens, Bacillus velezensis*, and *Bacillus megaterium;*

*Bacillus subtilis, Bacillus amyloliquefaciens, Bacillus velezensis*, and *Bacillus atrophaeus;*

*Bacillus subtilis, Bacillus velezensis, Bacillus megaterium*, and *Bacillus atrophaeus;*

*Bacillus licheniformis, Bacillus pumilus, Bacillus amyloliquefaciens*, and *Bacillus velezensis;*

*Bacillus licheniformis, Bacillus pumilus, Bacillus amyloliquefaciens*, and *Bacillus megaterium;*

*Bacillus licheniformis, Bacillus pumilus, Bacillus amyloliquefaciens*, and *Bacillus atrophaeus;*

*Bacillus licheniformis, Bacillus amyloliquefaciens, Bacillus velezensis*, and *Bacillus megaterium;*

*Bacillus licheniformis, Bacillus amyloliquefaciens, Bacillus velezensis*, and *Bacillus atrophaeus;*

*Bacillus licheniformis, Bacillus amyloliquefaciens, Bacillus megaterium*, and *Bacillus atrophaeus;*

*Bacillus pumilus, Bacillus amyloliquefaciens, Bacillus velezensis*, and *Bacillus megaterium;*

*Bacillus pumilus, Bacillus amyloliquefaciens, Bacillus velezensis*, and *Bacillus atrophaeus;*

*Bacillus pumilus, Bacillus velezensis, Bacillus megaterium*, and *Bacillus atrophaeus*; and

*Bacillus amyloliquefaciens, Bacillus velezensis, Bacillus megaterium*, and *Bacillus atrophaeus.*

The cleaning compositions may in particular embodiments comprise blends of bacterial spores of two or more strains, including at least two, at least three, at least four, and at least five of the bacterial spores described herein.

In a particularly preferred embodiment, the bacterial spores are *Bacillus* strains with a registration reference selected from the group consisting of ATCC 6051A, ATCC 12713, ATCC 14581, ATCC 55406, ATCC 700385, NRRL B-50017, NRRL B-50136, NRRL B-50147, NRRL B-50255, NRRL B-50398, NRRL B-50606, NRRL B-50607, NRRL B-50622, NRRL B-50623, NRRL B-50887, PTA-3142, PTA-7543, PTA-7549, SD-6991, SD-6992, and SB3106.

ATCC and PTA registration references are maintained by the American Type Culture Collection.

NRRL registration references are maintained by the Agricultural Research Service Culture Collection.

Examples of commercial blends of bacterial spores include Microvia Pro and Microvia Active (available from Novozymes Biologicals Inc), which are *Bacillus* spore blends.

The fermentation of the bacterial spores disclosed herein may be conducted using conventional fermentation processes, such as, aerobic liquid-culture techniques, shake flask cultivation, and small-scale or large-scale fermentation (e.g., continuous, batch, fed-batch, solid state fermentation, etc.) in laboratory or industrial fermentors, and such processes are well-known in the art. Notwithstanding the production process used to produce the bacterial spores, the bacterial spores may be used directly from the culture medium or subject to purification and/or further processing steps (e.g., a drying process).

Following fermentation, the bacterial spores may be recovered using conventional techniques (e.g., by filtration, centrifugation, etc.). The bacterial spores may alternatively be dried (e.g., air-drying, freeze drying, or spray drying to a low moisture level, and storing at a suitable temperature, e.g., room temperature).

The microbial cleaning composition comprises the bacterial spores in an amount of at least $10^4$ cfu/m L, preferably in an amount of at least $10^5$ cfu/m L.

Further embodiments of the invention include:

Embodiment 1. An aqueous microbial cleaning composition, comprising (a) at least $10^4$ cfu/mL of bacterial spores, and (b) at least 0.1% w/w of a primary surfactant selected from the group consisting of alkyl polyglucosides and sodium lauryl ether sulfates;

wherein the surface tension of the composition is 30 mN/m or lower at 20° C.

Embodiment 2. The composition of embodiment 1, wherein the bacterial spores are *Bacillus* spores.

Embodiment 3. The composition of embodiment 1 or 2, wherein the bacterial spores are spores of *Bacillus subtilis, Bacillus licheniformis, Bacillus pumilus, Bacillus amyloliquefaciens, Bacillus velezensis, Bacillus megaterium, Bacillus atrophaeus, Bacillus mojavensis, Bacillus paralicheniformis*, or *Bacillus thuringiensis.*

Embodiment 4. The composition of any of embodiments 1-3, wherein the amount of viable bacterial spores is reduced 1 log or less after storage for 8 weeks at 20° C.

Embodiment 5. The composition of any of embodiments 1-4, wherein the surface tension of the composition is in the range of 20-30 mN/m at 20° C.; preferably 25-30 mN/m at 20° C.

Embodiment 6. The composition of any of embodiments 1-5, which further comprises a secondary surfactant.

Embodiment 7. The composition of embodiment 6, wherein the secondary surfactant is a linear fatty alcohol, linear or branched alcohol ethoxylate, or alkylphenol ethoxylate Embodiment 8. The composition of embodiment 6 or 7, wherein the secondary surfactant is a linear fatty alcohol.

Embodiment 9. The composition of embodiment 7 or 8, wherein the linear fatty alcohol is selected from the group consisting of 1-octanol, 1-nonanol, 1-decanol, 1-undecanol, 1-dodecanol, and combinations thereof.

Embodiment 10. The composition of embodiment 6 or 7, wherein the secondary surfactant is a linear alcohol ethoxylate.

Embodiment 11. The composition of embodiment 7 or 10, wherein the linear alcohol ethoxylate is selected from the group consisting of Bio-Soft N23-6.5, Bio-Soft N25-7, Bio-Soft N25-9, and combinations thereof.

Embodiment 12. The composition of embodiment 6 or 7, wherein the secondary surfactant is a branched alcohol ethoxylate.

Embodiment 13. The composition of embodiment 7 or 12, wherein the branched alcohol ethoxylate is selected from the group consisting of Triton HW-1000, Makon DA-6, Makon DA-9, and combinations thereof.

Embodiment 14. The composition of embodiment 6 or 7, wherein the secondary surfactant is an alkylphenol ethoxylate.

Embodiment 15. The composition of embodiment 7 or 14, wherein the alkylphenol ethoxylate is selected from the group consisting of polyoxyethylenated nonylphenol, polyoxyethylenated octylphenol, and combinations thereof.

Embodiment 16. The composition of any of embodiments 6-15, wherein the ratio between the primary and secondary surfactants is in the range of 1:10 to 20:1.

Embodiment 17. The composition of any of embodiments 6-16, wherein the ratio between the primary and secondary surfactants is in the range of 1:5 to 20:1.

Embodiment 18. The composition of any of embodiments 6-17, wherein the ratio between the primary and secondary surfactants is in the range of 1:2 to 20:1.

Embodiment 19. The composition of any of embodiments 6-18, wherein the ratio between the primary and secondary surfactants is in the range of 1:1 to 20:1.

Embodiment 20. The composition of any of embodiments 1-19, which comprises at least 0.5% w/w of the primary surfactant.

Embodiment 21. The composition of any of embodiments 1-20, wherein the total surfactant concentration is more than 0.5% w/w; preferably less than 20% w/w.

Embodiment 22. The composition of any of embodiments 1-21, which comprises at least 1% w/w of the primary surfactant.

Embodiment 23. The composition of any of embodiments 1-22, wherein the total surfactant concentration is more than 1% w/w; preferably less than 20% w/w.

Embodiment 24. The composition of any of embodiments 1-23, which comprises at least $10^5$ cfu/mL of the bacterial spores.

Embodiment 25. The composition of any of embodiments 1-24, wherein the bacterial spores are a blend of bacterial spores of at least two bacterial strains, preferably at least three bacterial strains, more preferably at least four bacterial strains, and most preferably at least five bacterial strains.

Embodiment 26. The composition of any of embodiments 1-25, which further comprises a salt.

Embodiment 27. The composition of any of embodiments 1-26, which further comprises an inorganic salt.

Embodiment 28. The composition of embodiment 26-27, wherein the salt is a sodium, potassium or ammonium salt.

Embodiment 29. The composition of any of embodiments 26-28, wherein the salt is a sulfate, carbonate, bicarbonate, nitrate, chloride, phosphate or citrate.

Embodiment 30. The composition of any of embodiments 26-29, wherein the salt is selected from the group consisting of sodium sulfate, potassium sulfate, ammonium sulfate, sodium carbonate, potassium carbonate, ammonium carbonate, sodium bicarbonate, potassium bicarbonate, ammonium bicarbonate, sodium nitrate, potassium nitrate, ammonium nitrate, sodium chloride, potassium chloride, ammonium chloride, sodium phosphate, potassium phosphate, ammonium phosphate, sodium citrate, potassium citrate, and ammonium citrate.

Embodiment 31. The composition of any of embodiments 26-30, which comprises 1-10% w/w of the salt.

Embodiment 32. The composition of any of embodiments 1-31, wherein the pH of the composition is in the range of pH 5-9.

Embodiment 33. The composition of any of embodiments 1-32, wherein the pH of the composition is in the range of pH 5.5-8.5.

Embodiment 34. The composition of any of embodiments 1-33, wherein the pH of the composition is in the range of pH 6-8.

Embodiment 35. The composition of any of embodiments 1-34, which further comprises a buffer.

Embodiment 36. The composition of any of embodiments 1-35, which further comprises a buffer having a pKa in the range of 5-9.

Embodiment 37. The composition of any of embodiments 1-36, which further comprises 0.5-10% w/w of a buffer having a pKa in the range of 5-9.

Embodiment 38. The composition of any of embodiments 1-37, which further comprises 1-8% w/w of a buffer having a pKa in the range of 5-9.

EXAMPLES

The present invention is further described by the following examples which should not be construed as limiting the scope of the invention.

Chemicals were commercial products of at least reagent grade.

Germination Efficiency

A microbial cleaning composition is freshly prepared, and 0.1 mL of the composition is spread on an agar plate. The agar plate is incubated for 24 hours at 35° C., and the plate is analyzed via DigiEye software (Verivide, Leicester, UK). If bacterial colonies cover at least 75% of the surface of the agar plate, the germination efficiency is considered acceptable.

Example 1

Microbial Cleaning Composition with Alkyl Polyglycoside Surfactant

This formulation was prepared using an alkyl polyglycoside surfactant. Glucopon 215 UP contains 63.5% w/w alkyl polyglycoside, so the total surfactant concentration in this formulation was 2% w/w. Citric acid and sodium citrate was used as a buffer system (about pH 6.5) and phenoxyethanol was added as a preservation agent up to 2%. Microvia Pro is a *Bacillus* spore blend containing about $2\times10^9$ cfu/mL (available from Novozymes Biologicals Inc).

The surface tension of the formulation shown in Table 2 is 29.49 mN/m.

TABLE 2

Liquid microbial cleaning composition with alkyl polyglycoside surfactant.

| Component | Amount (% w/w) |
|---|---|
| Glucopon 215 UP (alkyl polyglycoside) | 3.15 (2% alkyl polyglycoside) |
| Citric acid | 0.08 |
| Sodium citrate tribasic dihydrate | 0.49 |
| Microvia Pro *Bacillus* spore blend | 1.00 |
| 2-phenoxyethanol (preservative) | 0.95 |
| Water | ad 100 |

TABLE 2B 5x concentrated liquid microbial cleaning composition with alkyl polyglycoside.

| Component | Amount (% w/w) |
|---|---|
| Glucopon 215 UP (alkyl polyglycoside) | 15.75 (10% alkyl polyglycoside) |
| Citric acid | 0.40 |
| Sodium citrate tribasic dihydrate | 2.45 |
| Microvia Pro *Bacillus* spore blend | 5.00 |
| 2 - Phenoxyethanol (preservative) | 2.00 |
| Water | ad 100 |

The spore germination efficiency of the formulation shown in Table 2 was 91.4%.

The spore viability exhibited a 0.10 log-reduction of colony forming units per milliliter (cfu/mL) after incubation of the formulation shown in Table 2 for 52 weeks at room temperature. The 5× concentrate (Table 2B) exhibited a 0.13 log-reduction of cfu/mL over 52 weeks at room temperature.

Example 2

Microbial Cleaning Composition with Alkyl Polyglycoside and Fatty Alcohol Surfactants This formulation was prepared by combining an alkyl polyglycoside surfactant (Glucopon 215 UP; 63.5% w/w alkyl polyglycoside) with a linear fatty alcohol (1-decanol). The objective of preparing this formulation was to decrease the surface tension of the formulation of Example 1, thereby increasing the immediate-cleaning effect, while still allowing spore germination. To achieve this, 1-decanol was added as a secondary surfactant to the formulation. 1-Decanol is a nonionic surfactant, and the content shown in Table 3 allowed the formulation to be physically stable over the temperature range of 4-50° C. The total surfactant concentration in this formulation is 2% w/w.

The surface tension of the formulation shown in Table 3 is 25.95 mN/m. This is a large decrease in surface tension in comparison to the formulation of Example 1, and it will provide excellent immediate cleaning.

TABLE 3

Liquid microbial cleaning composition with alkyl polyglycoside and 1-decanol

| Component | Amount (% w/w) |
|---|---|
| Glucopon 215 UP (alkyl polyglycoside) | 2.99 (1.9% alkyl polyglycoside) |
| 1-decanol | 0.10 |
| Citric acid | 0.08 |
| Sodium citrate tribasic dihydrate | 0.49 |
| Microvia Pro *Bacillus* spore blend | 1.00 |
| 2-phenoxyethanol (preservative) | 0.93 |
| Water | ad 100 |

TABLE 3B 5x concentrated microbial cleaning composition with alkyl polyglycoside and 1-decanol.

| Component | Amount (% w/w) |
|---|---|
| Glucopon 215 UP (alkyl polyglycoside) | 14.96 (9.5% alkyl polyglycoside) |
| 1-decanol | 0.50 |
| Citric acid | 0.40 |
| Sodium citrate tribasic dihydrate | 2.45 |
| Microvia Pro *Bacillus* spore blend | 5.00 |
| 2-phenoxyethanol (preservative) | 2.00 |
| Water | ad 100 |

Spore germination efficiency of the formulation shown in Table 3 was 82%.

The spore viability exhibited a 1.0 log-reduction of colony forming units per milliliter (CFU/mL) after incubation of the formulation shown in Table 3 for 8 weeks at room temperature.

Example 3

Microbial Cleaning Composition with Sodium Lauryl Ether Sulfate and Alcohol Ethoxylate This formulation was prepared by combining surfactants sodium lauryl ether sulfate-3 (Steol CS-330; 30% w/w SLES-3) and alcohol ethoxylate (Biosoft N23-6.5). The surfactants were applied in a 1:1 ratio. This formula allowed for spore germination (assessed by eye); however, the surface tension was 30.77 mN/m, which is higher than 30 mN/m, as required for general cleaning efficiency.

TABLE 4

Liquid microbial cleaning composition with SLES-3 and alcohol ethoxylate.

| Component | Amount (% w/w) |
|---|---|
| Steol CS-330 (SLES-3) | 16.67 (5% SLES-3) |
| Bio-Soft N23-6.5 (alcohol ethoxylate) | 5 |
| Citric acid | 0.017 |
| Sodium citrate tribasic dihydrate | 0.268 |
| Microvia Pro *Bacillus* spore blend | 5.00 |
| 2-phenoxyethanol (preservative) | 2.00 |
| Water | Ad 100 |

Example 4

Microbial Cleaning Composition with Sodium Lauryl Ether Sulfate, Alcohol Ethoxylate, and Salt The composition outlined in Example 3 did not have a surface tension of 30 mN/m or less, as required for achieving general cleaning efficiency. In this example, a cleaning composition was prepared by adding a salt (sodium nitrate) to a combination of surfactants sodium lauryl ether sulfate-3

(Steol CS-330; 30% w/w SLES-3) and a secondary alcohol ethoxylate (Triton HW-1000).

Thus, the objective was to reduce the surface tension by adding a salt to the cleaning composition. The resulting surface tension of the formulation in Table 5 is 29.79 mN/m, which is below the required surface tension of 30 mN/m or less. The formulation also provides excellent spore stability and germination efficiency.

TABLE 5

Liquid microbial cleaning composition with SLES-3, alcohol ethoxylate, and salt.

| Component | Amount (% w/w) |
|---|---|
| Steol CS-330 (SLES-3) | 5.83 (1.75% SLES-3) |
| Sodium Nitrate | 2.50 |
| Triton HW-1000 (secondary alcohol ethoxylate) | 0.25 |
| Citric acid | 0.0174 |
| Sodium citrate tribasic dihydrate | 0.268 |
| Microvia Pro *Bacillus* spore blend | 1.00 |
| 2-phenoxyethanol (preservative) | 2.00 |
| Water | Ad 100 |

Spore germination efficiency of the formulation shown in Table 5 was 77%.

The spore viability exhibited a 0.56 log-reduction of colony forming units per milliliter (cfu/mL) after incubation of the formulation shown in Table 5 for 8 weeks at room temperature.

The invention claimed is:

1. An aqueous microbial cleaning composition, comprising (a) at least $10^4$ cfu/mL of bacterial spores, and (b) at least 0.1% w/w of a primary surfactant selected from the group consisting of alkyl polyglucosides and sodium lauryl ether sulfates;

wherein the surface tension of the composition is 30 mN/m or lower at 20° C.;

wherein the composition further comprises a secondary surfactant; and wherein the amount of viable bacterial spores is reduced 1 log or less after storage for 8 weeks at 20° C.

2. The composition of claim 1, wherein the bacterial spores are *Bacillus* spores.

3. The composition of claim 1, wherein the bacterial spores are spores of *Bacillus subtilis, Bacillus licheniformis, Bacillus pumilus, Bacillus amyloliquefaciens, Bacillus velezensis, Bacillus megaterium, Bacillus atrophaeus, Bacillus mojavensis, Bacillus paralicheniformis*, or *Bacillus thuringiensis*.

4. The composition of claim 1, wherein the surface tension of the composition is in the range of 20-30 mN/m at 20° C.

5. The composition of claim 1, wherein the secondary surfactant is a linear fatty alcohol, linear or branched alcohol ethoxylate, or alkylphenol ethoxylate.

6. The composition of claim 1, wherein the ratio between the primary and secondary surfactants is in the range of 1:10 to 20:1.

7. The composition of claim 1, wherein the total surfactant concentration is at least 0.5% w/w.

8. The composition of claim 1, which comprises at least $10^5$ cfu/mL of the bacterial spores.

9. The composition of claim 1, wherein the bacterial spores are a blend of bacterial spores of at least two bacterial strains.

10. The composition of claim 1, which comprises at least 0.5% w/w of the primary surfactant.

11. The composition of claim 1, which further comprises a salt.

12. The composition of claim 11, wherein the salt is an inorganic sodium, potassium or ammonium salt.

13. The composition of claim 11, wherein the salt is selected from the group consisting of sodium sulfate, potassium sulfate, ammonium sulfate, sodium carbonate, potassium carbonate, ammonium carbonate, sodium bicarbonate, potassium bicarbonate, ammonium bicarbonate, sodium nitrate, potassium nitrate, ammonium nitrate, sodium chloride, potassium chloride, ammonium chloride, sodium phosphate, potassium phosphate, ammonium phosphate, sodium citrate, potassium citrate, and ammonium citrate.

14. The composition of claim 11, which comprises 1-10% w/w of a salt.

15. The composition of claim 1, wherein the surface tension of the composition is in the range of 25-30 mN/m at 20° C.

16. The composition of claim 1, wherein the total surfactant concentration is in the range of 0.5-20% w/w.

17. The composition of claim 1, wherein the total surfactant concentration is in the range of 1-20% w/w.

18. The composition of claim 1, wherein the ratio between the primary and secondary surfactants is in the range of 1:1 to 20:1.

* * * * *